United States Patent
Otaki et al.

(12) 
(10) Patent No.: US 6,549,334 B1
(45) Date of Patent: *Apr. 15, 2003

(54) TRANSMISSION ILLUMINATION TYPE DIFFERENTIAL INTERFERENCE MICROSCOPE

(75) Inventors: Tatsuro Otaki, Tokyo (JP); Kumiko Otaki, Tokyo (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 705 days.

(21) Appl. No.: 08/923,424

(22) Filed: Sep. 4, 1997

(30) Foreign Application Priority Data

Sep. 4, 1996 (JP) .............................. 8-255504
Jul. 16, 1997 (JP) .............................. 9-208613

(51) Int. Cl.⁷ ........................... G02B 21/06; G02B 21/00
(52) U.S. Cl. ..................... 359/386; 359/368; 359/371; 359/385
(58) Field of Search ................. 359/368–372, 359/385–387, 487, 494, 499

(56) References Cited

U.S. PATENT DOCUMENTS 3,868,168 A * 2/1975 De Veer ...................... 359/495
4,964,707 A * 10/1990 Hayashi ...................... 359/371
5,420,717 A * 5/1995 Tabata ........................ 359/386
5,572,359 A * 11/1996 Otaki et al. ................. 359/371

FOREIGN PATENT DOCUMENTS

JP 07071918 A 3/1995

OTHER PUBLICATIONS

Michael Bass et al., "Handbook of Optics—Devices, Measurements, & Properties", Second Edition, vol. II, pp. 17.32–17.37, Sponsored by the Optical Society of America (1995).

* cited by examiner

Primary Examiner—Thong Nguyen
(74) Attorney, Agent, or Firm—Morgan, Lewis & Bockius LLP

(57) ABSTRACT

In the transmission illumination type differential interference microscope, light in a given polarized state is separated by a first birefringent optical member 1 into two linearly polarized light components L1 and L2 and both of the polarized light components are converted into parallel light by means of a condenser lens 13. The object being examined 15 is illuminated by the polarized light components which are then converted into convergent light by an objective 16. Both of the polarized light components are then synthesized into a single light beam by a second birefringent optical element 2 and both of the polarized light components of the synthesized light beam are caused to undergo polarization interference by an analyzer 17 so that an enlarged image 18 of the object being examined 15, is formed. At least one of the first and second birefringent optical members 1 and 2 is formed by joining one isotropic prism 1g or 2g, consisting of an isotropic optical material, and one birefringent prism 1a or 2a, consisting of a birefringent optical material.

18 Claims, 7 Drawing Sheets

TRANSMISSION ILLUMINATION TYPE DIFFERENTIAL INTERFERENCE MICROSCOPE

This application claims the benefit of Japanese Patent Application No. 08-25504 filed Sep. 4, 1996.

BACKGROUND OF THE INVENTION

1. Field of the Invention

The present invention concerns a transmission illumination type differential interference microscope.

2. Discussion of the Related Art

One example of the construction of a conventional transmission illumination type differential interference microscope is shown in FIG. 6.

Illuminating light from a light source 10 is focused by a collector lens 11, and then illuminates a sample 15 on a slide glass 14 via a condenser lens 13. Light from the illuminated sample 15 is focused by an objective 16, so that an enlarged image 18 is formed. The observer observes this enlarged image 18 with eye 20 via an ocular lens 19. A polarizer 12 and a first Wollaston prism 5 are installed, in that order, in the light path between the collector lens 11 and the condenser lens 13; furthermore, a second Wollaston prism 6 and an analyzer 17 are installed, in that order, in the light path between the objective 16 and the enlarged image 18. The first Wollaston prism 5 is positioned at a front-side focal plane of the condenser lens 13, i.e., at the light-source side focal plane of the condenser lens 13, while the second Wollaston prism is positioned at the rear-side focal plane of the objective 16, i.e., at the image-side focal plane of the objective 16.

The principle of differential interference microscope, in the above-mentioned construction, will be outlined with reference to FIG. 6. Illuminating light from the light source 10, which has been focused via the collector lens 11, is converted into linearly polarized light whose plane of vibration is inclined 45° with respect to the plane of the page by the polarizer 12. As a result of the birefringent action of the first Wollaston prism 5, the light from the polarizer 12 is separated into linearly polarized light L1, which vibrates in the direction perpendicular to the plane of the page, and linearly polarized light L2, which vibrates in a direction parallel to the plane of the page, i.e., into two light beams which are perpendicular to the optical-axis and perpendicular to each other. Both light beams L1 and L2 proceed with a small angle of separation after passing through the first Wollaston prism 5, and reach the sample 15 as substantially parallel light beams as a result of the focusing action of the condenser lens 13.

After both light beams L1 and L2 pass through separate positions on the sample 15, the light beams are focused on the second Wollaston prism 6 by the focusing action of the objective 16, and these light beams are again induced to proceed along the same light path by the birefringent action of the second Wollaston prism 6. Of the two substantially perpendicular linearly polarized light components of the light beams L1 and L2, only the vibrational component, in the direction of the transmission axis of the analyzer 17, is extracted by the analyzer 17 and induced to interfere, and the interference fringes, corresponding to the phase difference applied to the two light beams L1 and L2 inside the sample, are observed.

The constructions of the first and second Wollaston prisms 5 and 6 used as birefringent members, in the above-mentioned conventional example will now be described with reference to FIG. 7. In a Wollaston prism, such as the prism 5, a pair of wedge-shaped prisms 5a and 5b consisting of an optical material, which possesses birefringence, e.g., a crystal such as quartz crystal, calcite, or sapphire, etc., are connected together so that the optic-axis 5bx of wedge-shaped prism 5b is parallel to the joining surface 5s and perpendicular to the optical-axis Z, and so that the optic-axis 5ax of wedge-shaped prism 5a is perpendicular to both the optic-axis 5bx of the first prism 5b and the optical-axis Z.

In FIG. 7, the optic-axis 5ax of the wedge-shaped prism 5a, positioned on the side from which the light beams are incident on the Wollaston prism, is oriented parallel to the plane of the page (as indicated by the arrows in the figure), while the optic-axis 5bx of the wedge-shaped prism 5b, which is also denoted as emission-side prism, is perpendicularly oriented to the plane of the page (as indicated by the + sign in FIG. 7), and both optic-axes 5ax and 5bx are oriented so that the directions of these optic-axes are perpendicular to the optical-axis Z. However, this combination of optic-axis orientations could also be arranged so that the orientations on an incident side, wedge-shaped prism 5a, and the emission side are reversed, i.e., so that optic-axis 5ax of the wedge-shaped prism 5a, which is also denoted as the incident-side prism, is perpendicular to the plane of the page, and so that the optic-axis 5bx of the emission-side prism 5b is parallel to the plane of the page.

The above is an example of the construction of a birefringent optical member in a case where the respective focal planes of the condenser lens 13 and objective 16 lie outside the respective lenses 13 and 16. However, in cases where lenses 13 and 16 are each constructed of a plurality of lenses, the focal planes are capable of being positioned inside the respective lenses. In this type of configuration, the Wollaston prisms 5 and 6 cannot be positioned at the focal planes of lens 13 and 16, because the respective focal planes lie within the lenses, therefore, a Nomarski prism 7, which is modified Wollaston prism such as that depicted in FIG. 8, may be utilized.

The Nomarski prism 7 is a prism in which the optic-axis 7bx of prism 7b is oriented parallel to the joining surface 7s and perpendicular to the optical-axis Z, while the optic-axis 7ax of the prism 7a is oriented perpendicular to the optic-axis 7bx of the prism 7b and inclined by an angle θ from a plane that is perpendicular to the optical-axis Z. By using such a construction, it is possible to position the separation point SP of the two light beams (which was located inside the prism in the case of the Wollaston prism shown in FIG. 7) outside the prism. By positioning the separation point SP of the two beams located outside the prism at the focal planes of the respective lenses 13 and 16, it is possible to obtain an effect similar to that obtained when Wollaston prisms are positioned at these focal planes.

The Wollaston prisms 5 and 6 or the Nomarski prism 7 used as birefringent optical members, in the above-described conventional examples, are prisms in which two wedge-shaped prisms, 5a and 5b or 7a and 7b consisting of an optical material such as quartz crystal, calcite, or sapphire, etc., which possesses birefringence, are joined together so that the orientations of the respective optic axes 5ax and 5bx or 7ax and 7bx differ, as shown in FIG. 7 or FIG. 8. However, the above-mentioned birefringent materials are generally expensive; accordingly, it is difficult to lower the cost of differential interference microscopes which require such members.

Furthermore, in the birefringent materials, which make up these birefringent optical members, the refractive index to extraordinary ray (linearly polarized light which vibrates parallel to the plane determined by the optic-axis of the crystal and the normal axis of the wavefront) varies with to the above-mentioned angle of incidence. Additionally, the light path of any extraordinary rays passing through the birefringent materials also varies in accordance with the variation in the refractive index. Accordingly, in a conventional example, the phase difference between the separated light beams L1 and L2 generated when the light passes through the birefringent optical members 5 and 6 varies according to the angle of incidence of the incident light L with respect to the birefringent optical members 5 and 6.

Thus, within the field of observation of the microscope, the light which reaches the peripheral of the visual field corresponds to light which is obliquely incident on the birefringent members 5 and 6, while light which reaches the central portion of the visual field corresponds to light which is perpendicularly incident on the birefringent members 5 and 6. Therefore, within the field of observation, the phase difference in the peripheral portions of the field and the phase difference in the center of the field are different, and this difference appears as variances in the brightness and coloring within the field of observation.

SUMMARY OF THE INVENTION

The present invention is directed to a differential interference microscope, and the like, that substantially obviates one or more of the above problems due to limitations and disadvantages of the related art.

A first object of the present invention is to reduce the cost of a differential interference microscope by providing polarized light separating elements, which have a polarized light separating function comparable to that of birefringent optical members constructed entirely from conventional birefringent materials, and which contain optical materials that are less expensive than conventional materials.

A second object of the present invention is to reduce variances in the brightness and coloring in the differential interference microscope by providing polarized light separating elements in which the amount of variation in the phase difference of obliquely incident light relative to the phase difference of perpendicularly incident light that occurs when the light passes through the polarized light separating elements is smaller than in conventional polarized light separating elements.

In order to achieve the objects of the present invention, birefringent members are constructed using an isotropic material, such as glass, etc., which does not have birefringent properties in one of the prisms instead of using birefringent members consisting of a pair of prisms constructed using birefringent materials such as quartz crystal, calcite, or sapphire, etc., as in the conventional case.

Specifically, the present invention is a transmission illumination type differential interference microscope in which light in a given polarized state is separated by means of a first birefringent optical member into two linearly polarized light components whose planes of vibration are perpendicular to each other, both of the separated polarized light components are converted into parallel light components by means of a condenser lens where the object being examined is illuminated by the polarized light components which have been converted into parallel light component. Both of the polarized light components, which have passed through the object being examined are then converted into convergent light by means of an objective and both of the polarized light components, which have been converted into convergent light are synthesized into a single light beam by means of a second birefringent optical member. Both of the polarized light components of the synthesized light beam are then caused to undergo polarization interference, and an enlarged image of the object being examined is imaged by the objective using the interfering light.

The first and second birefringent optical members are each formed by joining only two wedge-shaped prisms, and in at least one of the first and second birefringent optical members, one of the two wedge-shaped prisms constituting the birefringent optical member is an isotropic prism consisting of an isotropic optical material, while the other wedge-shaped prism is a birefringent prism consisting of a birefringent optical material.

The second object of the present invention is achieved by constructing first and second birefringent members so that one of the two wedge-shaped prisms constituting each of the birefringent optical members is an isotropic prism consisting of an isotropic optical material, while the other wedge-shaped prism is a birefringent prism consisting of a birefringent optical material. The first and second birefringent optical members are positioned so that the phase difference between the separated polarized light components generated by the first birefringent member is canceled by the second birefringent member.

Thus, in the present invention, the birefringent optical members used in a differential interference microscope are respectively constructed by joining together two wedge-shaped prisms, on the condenser lens side and on the objective side. Among these birefringent optical members, at least one birefringent optical member is constructed by joining an isotropic prism consisting of an isotropic material such as glass, etc., and a birefringent prism consisting of a birefringent material such as quartz crystal, etc.

For example, in cases where both the front-side focal plane of the condenser lens and the rear-side focal plane of the objective lie outside the respective lenses, or in cases where one of these focal planes, i.e., either the front-side focal plane of the condenser lens or the rear-side focal plane of the objective, lie outside the corresponding lens, one of the two wedge-shaped prisms constituting the first birefringent member, i.e., either the incident-side prism or the emission-side prism, is formed as an isotropic prism, while the other prism is formed as a birefringent prism. Similarly, of the two wedge-shaped prisms constituting the second birefringent member, one of the prisms is formed as an isotropic prism, while the other prism is formed as a birefringent prism.

Furthermore, in cases where both the front-side focal plane of the condenser lens and the rear-side focal plane of the objective lie inside the corresponding lenses, either or both of the birefringent members are constructed by joining an isotropic prism and a birefringent prism in the same manner as described above, or only one of the total of four wedge-shaped prisms constituting the two birefringent members is formed as an isotropic prism.

Therefore, in the present invention, birefringent members are constructed by replacing either one or two of the total of four wedge-shaped prisms consisting of birefringent optical materials used in the above-mentioned prior art with an isotropic material such as glass, etc., which does not have birefringent properties. Generally, isotropic materials such as glass, etc., are less expensive than birefringent materials; accordingly, the cost of an optical system requiring birefringent optical members, and especially the cost of a transmission illumination type differential interference microscope, can be reduced.

Additionally, in the present invention, in cases where the first and second birefringent members are constructed as birefringent prisms in which one of the above-mentioned two wedge-shaped prisms constituting each of these birefringent optical members is formed as an isotropic prism consisting of an isotropic optical material, while the other wedge-shaped prism is formed as a birefringent prism consisting of a birefringent optical material, the optical path lengths of the first and second birefringent members can be shortened by approximately ½ compared to the optical path lengths of conventional birefringent members. Accordingly, the phase difference between the separate light beams separated by the first birefringent member can be canceled by applying a phase difference in opposition to this phase difference when the separate light beams are synthesized by the second birefringent member. In this case, the phase difference between the light that is obliquely incident on the first and second birefringent optical materials and the light that is perpendicularly incident is small, so that variances in brightness and coloring within the field of observation can be reduced.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 6:
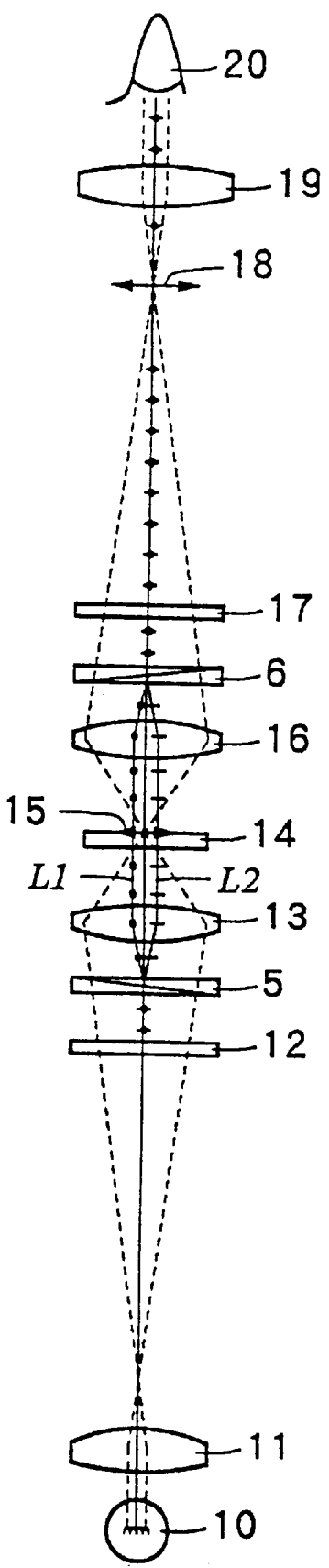
FIG. 6 is a structural diagram illustrating a conventional transmission illumination type differential interference microscope.
Figure 7:
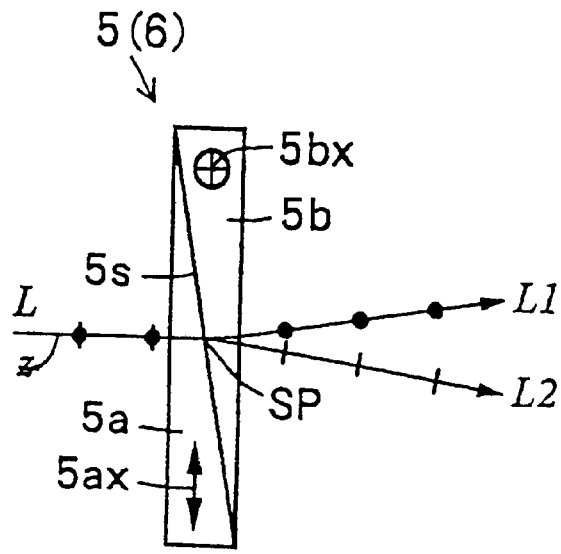
FIG. 7 is a structural diagram of a Wollaston prism used in a conventional example.
Figure 8:
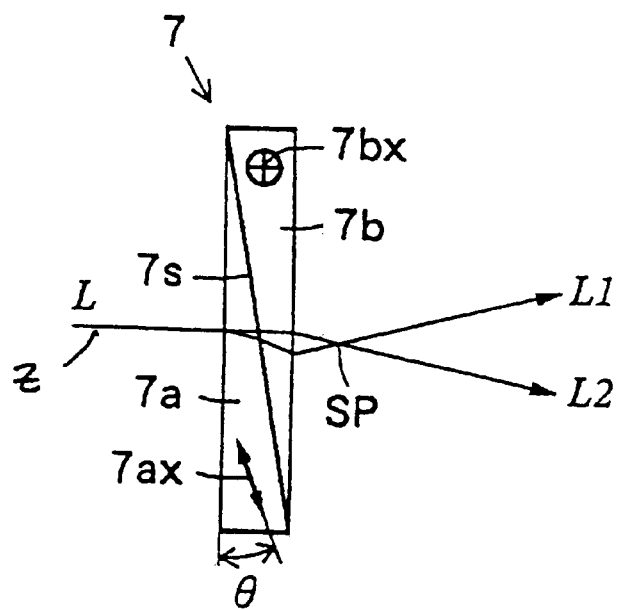
FIG. 8 is a structural diagram of a Nomarski prism used in a conventional example.

Reference will now be made in detail to the preferred embodiment of the present inventions, examples of which are illustrated in the accompanying drawings. It is noted that the system elements and their respective reference numerals, which are duplicated by the conventional transmission illumination type differential interference microscope of FIG. 6, will be omitted.

Figure 1:
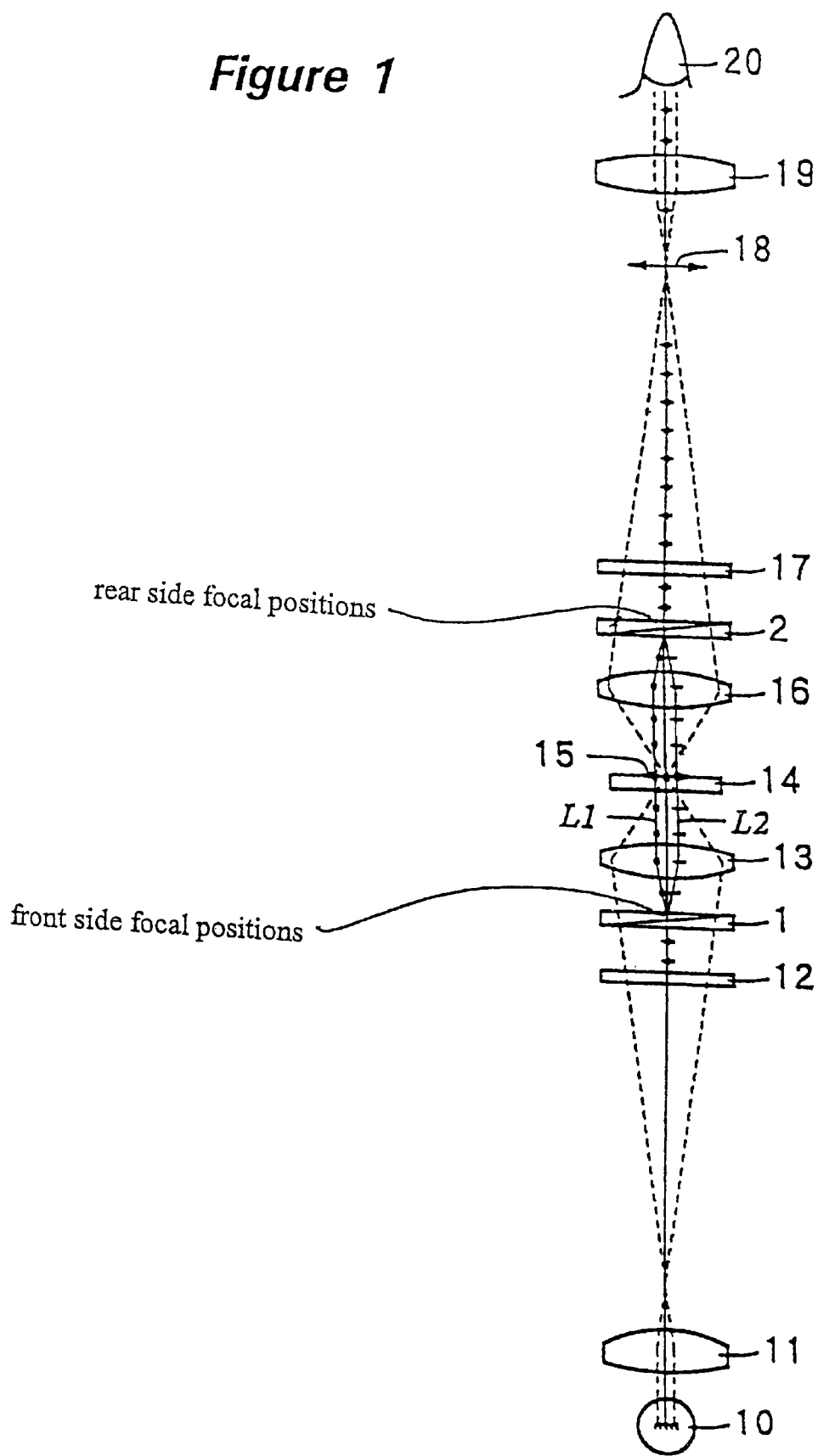
FIG. 1 is a structural diagram illustrating a first embodiment of the present invention.

FIG. 1 is a schematic diagram which illustrates a first preferred embodiment of the present invention. In this preferred embodiment, first and second birefringent optical members 1 and 2, which have a light beam separating effect comparable to that of Wollaston prisms, are respectively used in place of the first and second Wollaston prisms 5, 6 used in the conventional example shown in FIG. 6.

Figure 2:
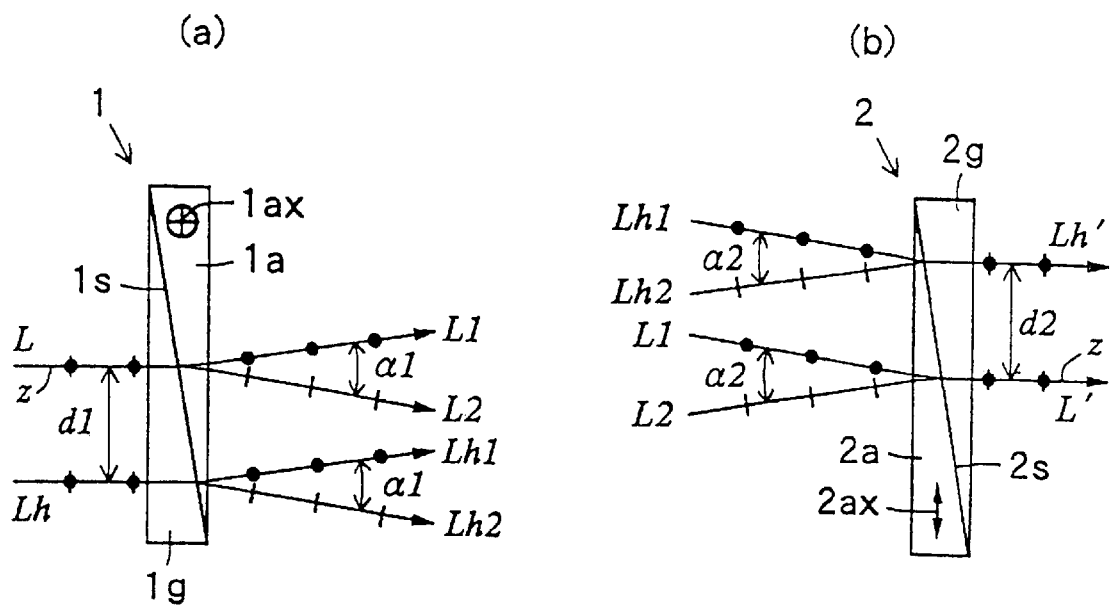
FIGS. 2(A) and (B) are structural diagrams illustrating the birefringent optical members used in a first preferred embodiment of the present invention.

FIGS. 2(A) and 2(B) are respective enlarged views of the first and second birefringent members 1 and 2. The first birefringent member 1 is constructed by joining an isotropic prism 1g, formed in the shape of a wedge using an optical material such as glass, etc., which exhibits optical isotropy and does not have birefringent properties, and a birefringent prism 1a, formed in the shape of a wedge using an optical material which has birefringent properties, in that order, on the incident side. Likewise, the second birefringent member 2 is constructed by joining a birefringent prism 2a formed using a birefringent material, and an isotropic prism 2g formed using an isotropic material, in that order, on the incident side.

The joining surfaces 1s and 2s, of the respective birefringent members 1 and 2, are positioned such that the plane perpendicular to the optical-axis Z is rotated by the wedge angle about an axis of rotation which is perpendicular to the optical-axis Z. Both of these axes of rotation are parallel to each other and the direction of rotation by the above-mentioned wedge angle is in the same direction for both joining surfaces 1s and 2s.

Furthermore, the optic-axis 1ax of the first birefringent prism is oriented in a direction that is parallel to the joining surface 1s and perpendicular to the optical-axis Z, i.e., in a direction that is perpendicular to the plane of the page (indicated by the + sign in the FIG. 2A). Likewise, the optic-axis 2ax of the second birefringent prism is oriented in a direction that is perpendicular to both the optic-axis 1ax of the first birefringent prism and the optical-axis Z, i.e., in a direction that is parallel to the plane of the page (indicated by the arrows in the FIG. 2B).

The light beam L, which enters the first birefringent member on the optical-axis Z, can be decomposed into a linearly polarized light component L1 whose plane of vibration is perpendicular to the plane of the page and a linearly polarized light component L2 whose plane of vibration is parallel to the plane of the page. However, since the isotropic prism 1g on which these light components are initially incident is optically isotropic, both light beams L1 and L2 travel along the same light path through the isotropic prism 1g and reach the joining surface 1s.

The birefringent material generally has the property that the refractive index of the material varies according to the angle formed by the direction of vibration of incident light with respect to the optic-axis of the birefringent material. When light is incident on such a material, the light is split into two light beams whose directions of vibration are perpendicular to each other. In the present preferred embodiment, the light beams L1 and L2 correspond to these two light beams. Specifically, the plane of vibration of the light beam L1 is parallel to the optic-axis 1ax of the first birefringent prism, while the plane of vibration of the light beam L2 is perpendicular to the optic-axis 1ax of the first birefringent prism, resulting in the refractive indices n1 and n2 of the two light beams, L1 and L2 inside the birefringent prism 1a, being different from each other.

As a result, since the two light beams L1 and L2 are subjected to refractive effects with different angles, both upon entering the birefringent prism 1a and upon leaving the birefringent prism 1a, these light beams are emitted from the first birefringent member 1 at a fixed separation angle of α1.

At the same time, since the refractive indices n1 and n2 of the two light beams L1 and L2 inside the birefringent prism 1a are different, a phase difference δ1 is generated in the birefringent prism 1a.

The two light beams L1 and L2 which leave the first birefringent member 1 at a separation angle of α1 are converted into parallel light beams by the condenser lens 13 and are incident on sample 15 at separate positions. The two light beams L1 and L2 that are incident on the sample 15 pass through the sample which imparts a phase difference Δ that is caused by the difference dt in the thickness of the sample 15 and the difference dn in the refractive index between the slightly separated positions of incidence dx. Thereafter, both light beams L1 and L2 are converted into convergent light by the objective 16 and are incident on the second birefringent member 2 at a convergence angle of α2.

The light beam separating effect generated by the first birefringent member 1 occurs even if the direction of travel of the light is reversed; in this case, this reversed relationship is established in the second birefringent member 2. Specifically, the two light beams L1 and L2, which are incident on the second birefringent prism 2a at a beam convergence angle of α2, are subjected to refractive effects with different angles both upon entering the birefringent prism 2a and upon leaving the birefringent prism 2a, so that the two light beams proceed along the same light path inside the isotropic prism 2g thus forming a light beam L' which is emitted from the second birefringent member 2. At the same time, a phase difference δ2 is generated between the two light beams L1 and L2 in the birefringent prism 2a.

Next, the two light beams L1 and L2 are caused to undergo polarization interference by analyzer 17. Accordingly, the phase difference δ1 created by the first birefringent prism 1a, the phase difference Δ created by the sample 15, and the phase difference δ2 created by the second birefringent prism 2a all contribute to the interference fringes when the sample is observed. Therefore, in order to observe only the phase difference Δ in the sample 15, it is necessary to set the thicknesses and the orientations of the optic-axes, of the two birefringent prisms 1a and 2a, so that the phase difference δ1, generated between the two light beams L1 and L2 inside the first birefringent prism 1a, is canceled inside the second birefringent prism 2a, i.e., so that δ1+δ2=0. By forming the birefringent prisms in this manner, it becomes possible for the observer to view only the phase difference Δ in the sample as interference fringes.

Thus, the second birefringent member 2 must simultaneously perform an action which joins the two light beams L1 and L2, incident at a convergence angle of α2, into a single light beam L' and an action which cancels the phase difference generated between the two light beams L1 and L2 in the first birefringent member 1.

In cases where the same birefringent material is used for both birefringent prisms 1a and 2a, the relationship δ1+δ2=0 can be realized by arranging the orientations of the optic-axes 1ax and 2ax, of the two birefringent prisms 1a and 2a, so that both of these optic-axes 1ax and 2ax are perpendicular to the optical-axis Z and are also perpendicular to each other, as in the present preferred embodiment depicted in FIG. 2A and B.

In this case, the refractive index of the light beam L1, inside the second birefringent prism 2a, is equal to the refractive index n2 of the light beam L2, inside the first birefringent prism 1a, and the refractive index of the light beam L2, inside the second birefringent prism 2a, is equal to the refractive index n1 of the light beam L1, inside the first birefringent prism 1a.

As a result, if both birefringent prisms 1a and 2a are formed with substantially the same thickness on the optical-axis, the phase difference δ1 received by the two linearly polarized light components L1 and L2 of the light beam L on the optical-axis inside the first birefringent prism 1a, and the phase difference δ2 received by the same linearly polarized light components inside the second birefringent prism 2a, will be inverted so that δ1=−δ2. Therefore, the sum of the phase differences received by the two light beams L1 and L2 inside the two birefringent prisms 1a and 2a may be expressed as δ1+δ2=0, so that it is possible to observe only the phase difference Δ inside the sample.

In an actual interference microscope, the light which is incident on birefringent members 1 and 2 is not limited to the light beam L on the optical-axis Z. Light in positions removed from the optical-axis Z is also incident in accordance with the numerical aperture of the condenser lens 13 and objective 16. Accordingly, merely canceling the phase differences as described above for the light beam L on the optical-axis Z in FIG. 2, i.e., the light beam L that passes through the central portions of the birefringent members 1 and 2, is insufficient. The phase difference generated in the birefringent prisms 1a and 2a must be completely canceled for all light that is incident within a prescribed range.

Discussion will now be focused upon the light beam Lh, which is incident at a position separated from the center of the first birefringent member by a distance of d1, as depicted in FIG. 2(A). Like the light beam L passing through the center of the first birefringent member 1, the light beam Lh, which is incident on the first birefringent member 1, is separated into two light beams Lh1 and Lh2, which vibrate in mutually perpendicular directions, and which have a separation angle of α1. These two light beams Lh1 and Lh2 are emitted from the birefringent member 1. In this case, the distance traveled by the light beam Lh through the first birefringent prism 1a is shorter than the distance traveled by the light beam L on the optical-axis. Accordingly, the phase difference created between the two separated light beams Lh1 and Lh2 in the birefringent prism 1a is smaller than the phase difference in the case of the light beams L1 and L2. Meanwhile, on the side of the second birefringent member 2, the two light beams Lh1 and Lh2 are incident at a position separated from the center of the birefringent member 2 by a distance of d2.

As is shown in FIG. 2(B), the wedge direction of the second birefringent prism 2a is oriented such that the thickness of the prism 2a, at position d2, is less than the thickness at the center of the prism 2a. Accordingly, the thickness of the first birefringent prism 1a at a position separated from the center of the first birefringent member 1 by a distance of d1, is equal to the thickness of the second birefringent prism 2a, at a position separated from the center of the second birefringent member 2 by a distance of d2. Thus, the phase difference generated between the light beams Lh1 and Lh2 by the first birefringent prism 1a can be completely canceled by the second birefringent prism 2a.

Therefore, in the present preferred embodiment, the light beams separated by the first birefringent member 1 can be completely synthesized into a single light beam by the second birefringent member 2, not only in the case of light beam L, which is incident on the center of the first birefringent member 1, but also in the case of a light beam Lh which is incident at a position separated from the center of the first birefringent member 1. Furthermore, the phase difference created between the two light beams produced by the separation in the first birefringent member 1 can be completely canceled by the second birefringent member 2.

Accordingly, an enlarged image 18, of interference fringes corresponding only to the phase difference Δ inside the sample 15, can be observed.

Additionally, in the present preferred embodiment, the optic-axis 1ax of the first birefringent prism 1a was oriented perpendicular to the plane of the page, while the optic-axis 2ax of the second birefringent prism 2a was oriented parallel to the plane of the page; however, it would also be possible to reverse this combination so that the optic-axis 1ax of the first birefringent prism 1a is oriented parallel to the plane of the page, and the optic-axis 2ax of the second birefringent prism 2a is oriented perpendicular to the plane of the page.

Moreover, in the present preferred embodiment, the birefringent prism 1a is disposed on the light beam emission side in the first birefringent member 1, and the birefringent prism 2a is disposed on the light beam entry side in the second birefringent member 2. However, it is sufficient if (a) one birefringent prism is used in each of the birefringent members 1 and 2 so that polarized light separation is performed, and (b) the phase differences created by the two birefringent members 1 and 2 are canceled. As a result, in both of the birefringent members 1 and 2, the birefringent prisms 1a and 2a may be disposed on either the incident side or the emission side.

In the preferred embodiment, the arrangement used was the arrangement used in a case where the same birefringent material was employed for both of the birefringent prisms 1a and 2a. However, by combining different birefringent materials used in the birefringent prisms 1a and 2a, e.g., a positive crystal and a negative crystal, it is also be possible to cancel the light path length difference between the two light beams without using the arrangement of the preferred embodiment.

In the preferred embodiment it should be noted that polarization interference, between the light beams L1 and L2, was accomplished by means of an analyzer 17. However, it is also possible to accomplish polarization interference using a combination of phase-shifting members, such as a beam splitter and a ½-wave plate, etc., instead. In such a case, the light path is split into two light paths by means of the beam splitter and a ½ wave plate is inserted into one of the light paths, so that the polarization state of the light beam traveling along this split light path is altered. Thereafter, the two light beams are again synthesized by means of the beam splitter.

Figure 3:
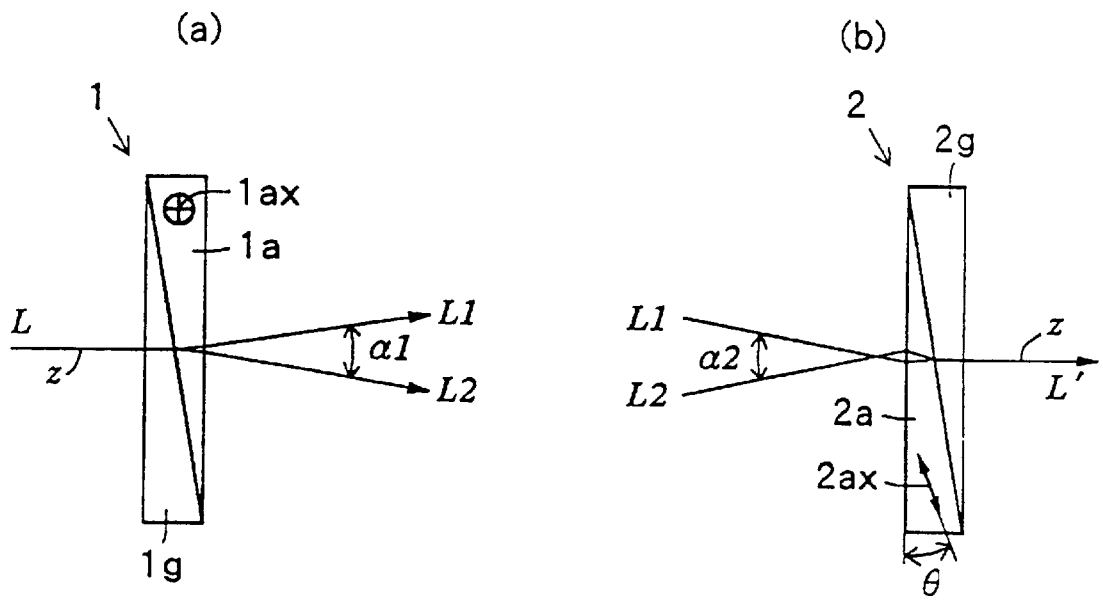
FIG. 3(A) and (B) are structural diagrams illustrating the birefringent optical members used in a second embodiment of the present invention.

A second embodiment of the present invention will now be described. The second embodiment is an embodiment in which one of the focal planes, i.e., either the front-side focal plane of the condenser lens 13 or the rear-side focal plane of the objective 16, lies inside the corresponding lens, while the remaining focal plane lies outside the corresponding lens. The constructions of the respective birefringent members 1 and 2 used in this case are shown in FIGS. 3(A) and 3(B). In the same figures, it is assumed that the rear-side focal plane of the objective is located inside the corresponding lens, wherein the light beam separation position of the second birefringent member 2 which is disposed between the objective 16 and the enlarged image 18 must lie outside the second birefringent member 2. Accordingly, as is shown in FIG. 3(B), of the two wedge-shaped prisms 2a and 2g constituting the second birefringent member 2, prism 2g is an isotropic prism constructed using an isotropic material such as glass, etc., while prism 2a is constructed using a birefringent material; furthermore, the direction of the optic-axis 2ax of the birefringent prism 2a (indicated by the arrows in the figure) is oriented so that this direction is parallel to the plane of the page and inclined by an angle of θ with respect to the entry surface of the prism.

As a result of this construction, the light beam separation position of the second birefringent member 2 can be positioned to lie outside the birefringent member 2. In the first birefringent member 1, as in the second birefringent member 2, the wedge-shaped prism 1g, is constructed from an isotropic material such as glass, or the like, while prism 1a is constructed from an optical material possessing birefringent properties.

In cases where the same birefringent material is used for both of the birefringent members 1 and 2, the members should be arranged so that the optic-axis 1ax of the first birefringent prism 1a is located in the plane perpendicular to the optical-axis Z and is also perpendicular to the optic-axis 2ax of the second birefringent prism 2a (as indicated by the + sign in the FIGS. 2(A) and 3(A)), i.e., so that the optic-axis 1ax is also perpendicular to the plane of the page. As in the first preferred embodiment, this is done so that the phase difference δ1 generated between the two light beams L1 and L2 that lie inside the first birefringent prism 1a will be canceled inside the second birefringent prism 2a. In this case, the wedge directions of the prisms should be oriented in the same directions as in the first preferred embodiment, so that the phase difference can be completely canceled even for light incident at the edges of the prisms.

Furthermore, in the present embodiment, the rear-side focal plane of the objective 16 lies inside the corresponding lens. However, in cases where the front-side focal plane of the condenser lens 13 lies inside the condenser lens 13, the birefringent members 1 and 2 may be installed in reversed positions with respect to the sample 15. Also, in the present embodiment of the two wedge-shaped prisms constituting each of the birefringent members 1 and 2, the prism 1a or 2a, disposed on the side of the sample 15 in each case, is formed as a birefringent prism. However, as in the case of the first embodiment, the present invention is not limited to such an arrangement.

Moreover, since polarized light separation is accomplished using a single prism 1a or 2a consisting of a birefringent material in each of the birefringent members 1 and 2, and since it is sufficient if the phase difference following the passage of the light through both birefringent members 1 and 2 is canceled, the birefringent prisms 1a and 2a may be disposed on either the incident side or the emission side in both of the birefringent members 1 and 2. Therefore, as in the first preferred embodiment, the phase difference between the two light beams is capable of being canceled by using materials with different birefringent properties in the two birefringent members 1 and 2.

Figure 9:
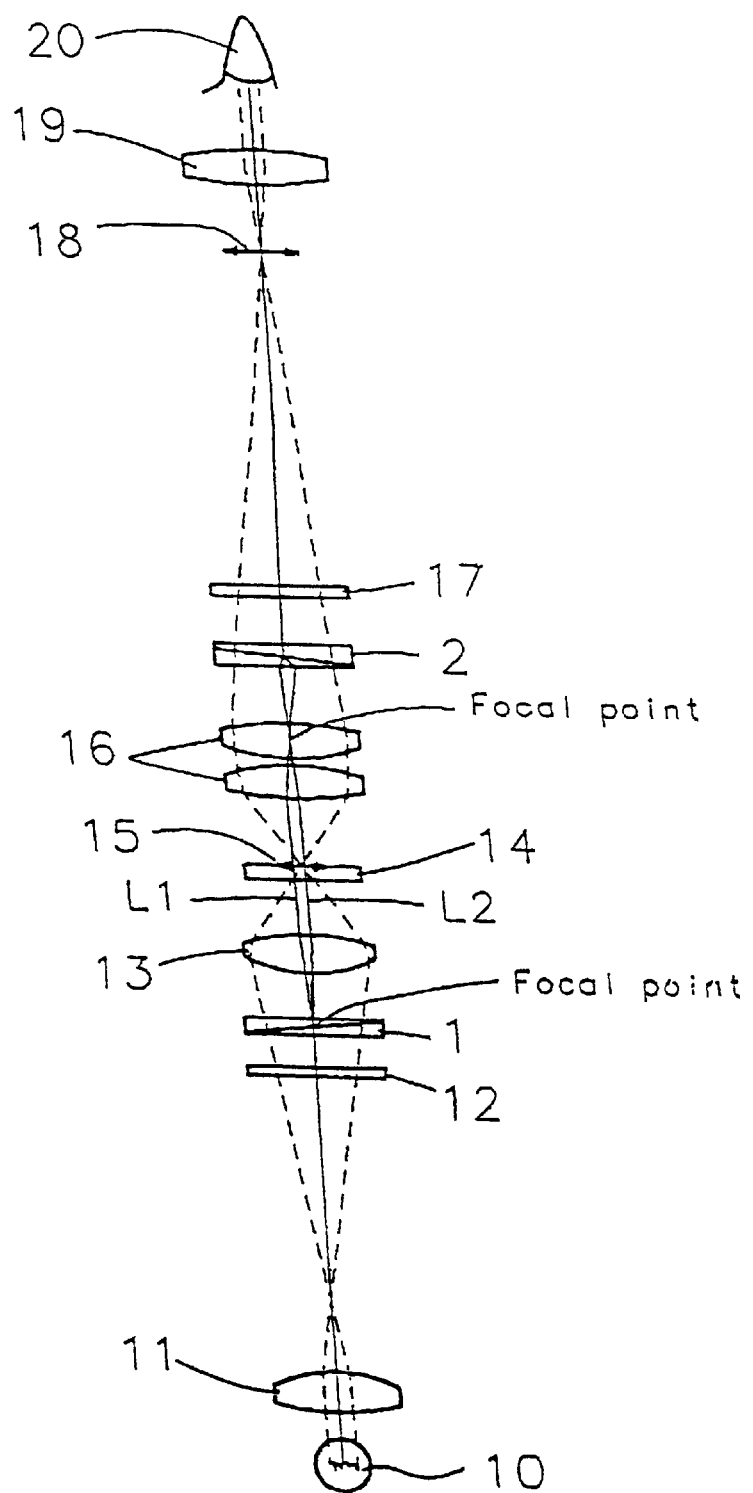
FIGS. 9 and 10 illustrate embodiments with alternate locations of light beam separation position.

The optical members in FIGS. 3(A)–3(B) correspond to FIG. 9. In this example the optical members that are constructed from a combination of birefringent and isotropic materials, and that have the light beam separation position located on the inside, are used on the condenser side. Optical members that have the light beam separation position located on the outside are used on the objective side.

Figure 4:
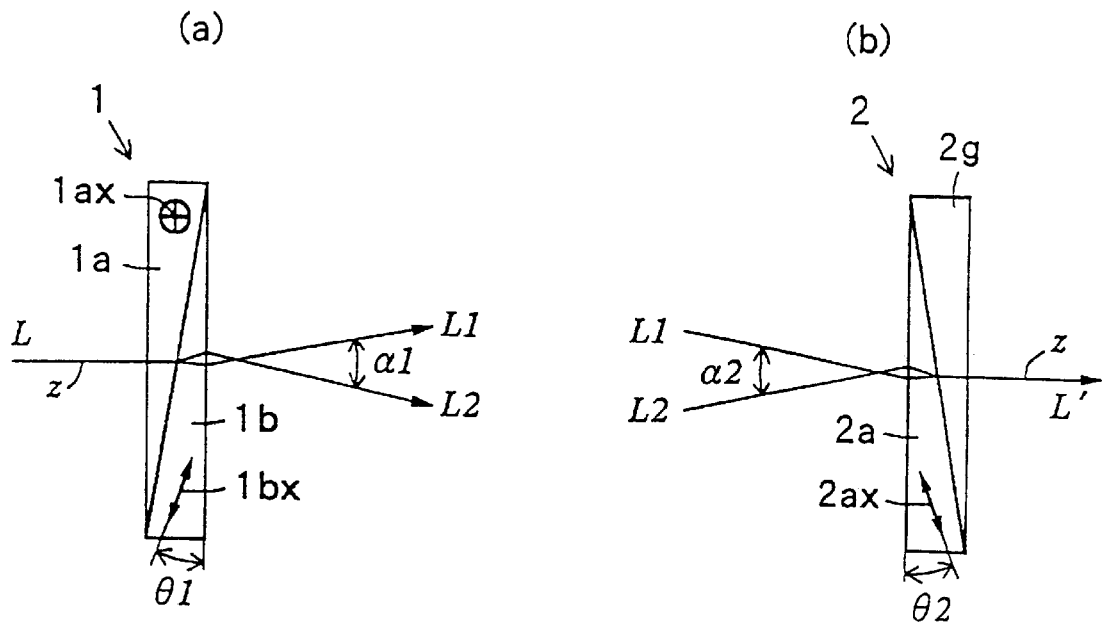
FIGS. 4(A) and (B) are structural diagrams illustrating the birefringent optical members used in a third embodiment of the present invention.

A third embodiment of the present invention will now be described. In this embodiment both the front-side focal plane of the condenser lens 13 and the rear-side focal plane of the objective 16 lie inside the corresponding lenses. The construction of the birefringent members 1 and 2 used in this case, are shown in FIGS. 4(A) and 4(B), respectively. In this case, it is necessary that the light beam separation positions of both of the birefringent members 1 and 2 lie outside the prisms. At least one of the birefringent members 1 and 2 is formed by joining an isotropic prism consisting of an isotropic optical material and a birefringent prism consisting of a birefringent optical material. In cases where it is desired to construct the birefringent members 1 and 2 using the same birefringent material, it is advisable to construct only one of the four wedge-shaped prisms, i.e., the isotropic prism 2g, using an isotropic material such as glass, or the like, and to construct the remaining three prisms 1a, 1b, and 2a using a birefringent material, as shown in FIGS. 4(A) and (B).

In FIG. 4(A), the first birefringent member 1, which is constructed using only a birefringent material, is disposed so that the optic-axis 1ax of one wedge-shaped prism 1a is perpendicular to the plane of the page and so that the optic-axis 1bx of the wedge-shaped prism 1b is parallel to the plane of the page and inclined by an angle of θ1, with respect to the emission surface of the prism. In FIG. 4(B) the second birefringent member 2, which is constructed from one birefringent prism 2a and one isotropic prism 2g, is disposed so that the optic-axis 2ax of the birefringent prism 2a is parallel to the plane of the page and inclined by an angle of θ2 with respect to the entry surface of the prism. Furthermore, the thickness of the birefringent prism 2a of the second birefringent member 2 is set at a thickness which cancels the phase difference generated between the two light beams L1 and L2 separated by the first birefringent member 1. In this case, furthermore, as is shown in FIGS. 4(A) and (B), the orientations of the wedge angles of the birefringent members 1 and 2 are set in opposite directions so that the orientations of the wedges of the respective members 1 and 2 show mirror symmetry with respect to the sample.

In the present embodiment, a total of three prisms 1a, 1b, and 2a, i.e., two prisms in the first birefringent member 1 and one prism in the second birefringent member 2, were constructed using a birefringent material. However, alternate constructions could also be used, as long as they satisfy the conditions that (a) a total of three prisms consisting of a birefringent material are used in the two birefringent members 1 and 2 so that the polarized light separation positions lie outside the respective prisms; and (b) the phase difference following the passage of the light through the two birefringent members 1 and 2 is capable of being canceled. Specifically, it is also possible to install a prism 1a with an optic-axis orientation perpendicular to the plane of the page in either of the birefringent members 1 and 2, or to install prisms 1b and 2a which have optic-axes parallel to the plane of the page on either the incident sides or emission sides of the first and second birefringent members 1 and 2.

Figure 5:
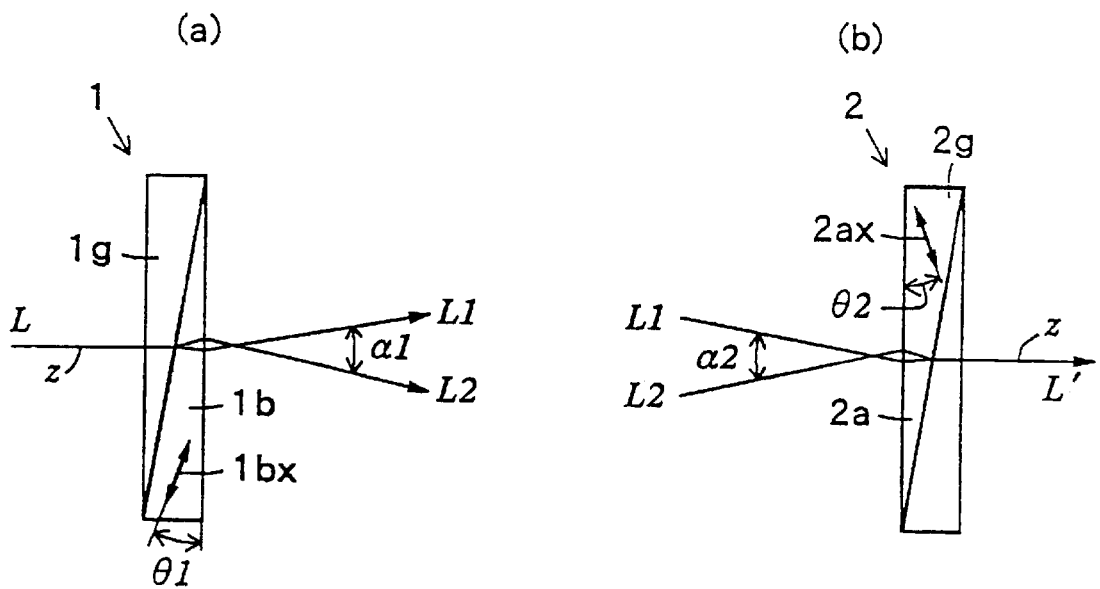
FIGS. 5(A) and (B) are structural diagrams illustrating the birefringent optical members used in a fourth embodiment of the present invention.

Additionally, in cases where optical materials with different birefringent properties are combined in the first and second birefringent members 1 and 2, e.g., in a case where a positive crystal is used in the first birefringent member and a negative crystal is used in the second birefringent member, the prism 1a which is disposed so that its optic-axis 1ax is perpendicular to the plane of the page in FIG. 4(A) is capable of being replaced by an isotropic prism 1g as shown in a fourth preferred embodiment illustrated in FIG. 5(A).

Figure 10:
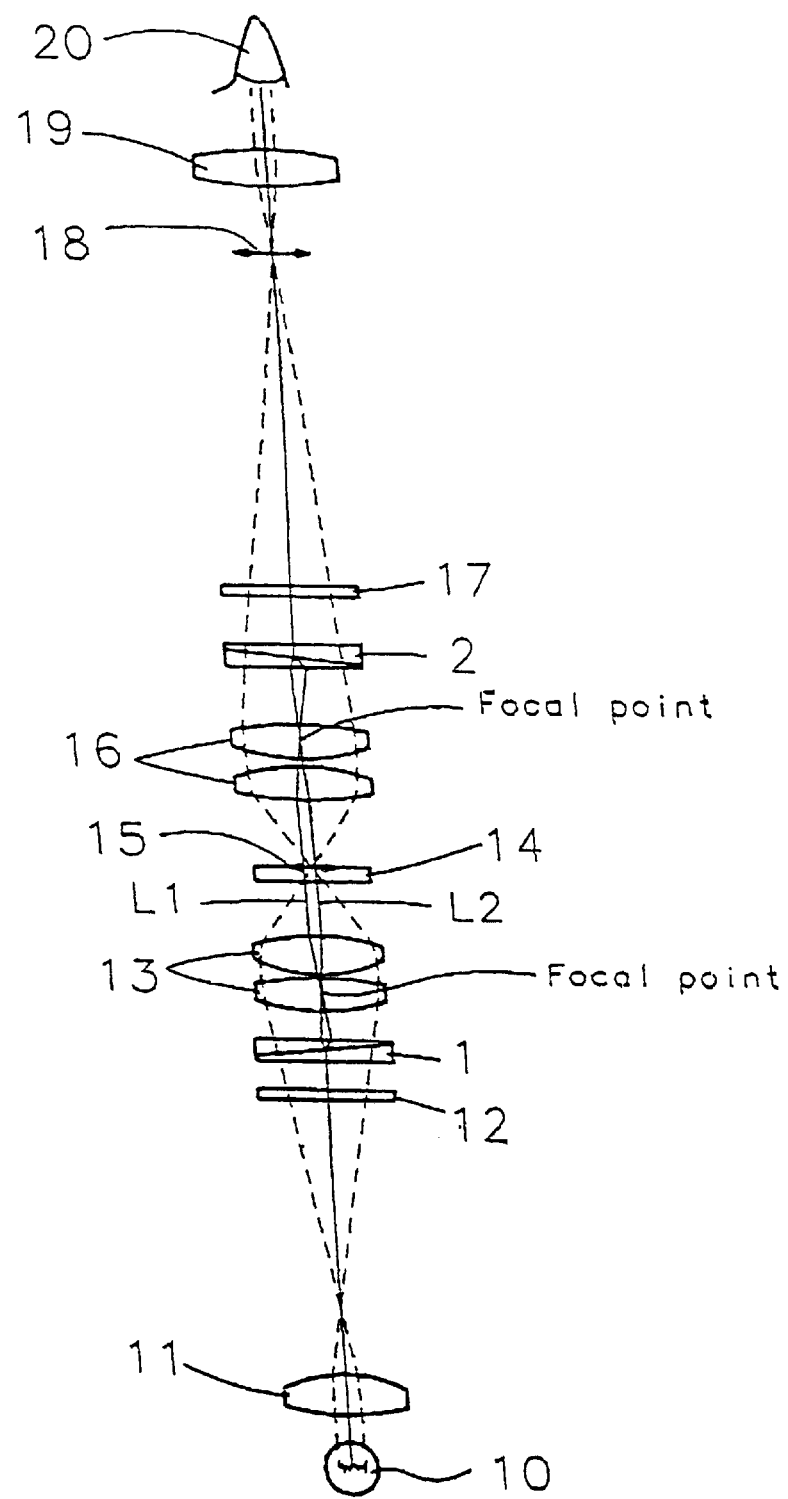

The optical members in FIGS. 4(A), 4(B) and FIGS. 5(A), 5(B) correspond to FIG. 10. In this example the optical members that are constructed from a combination of birefringent and isotropic materials, and that have the light beam separation position located on the outside, are used on both the condenser side and the objective side. The example shown in FIGS. 4(A), 4(B) illustrates a case where all of the birefringent materials include either a positive crystal or a negative crystal. The example shown in FIGS. 5(A), 5(B) illustrates a case where the birefringent material both a positive crystal and a negative crystal.

In the first and second embodiments, the optical path length through the birefringent members 1 and 2 is capable of being shortened by approximately ½ when compared to the optical path length in a conventional microscope. Accordingly, the difference between the phase difference of separated light beams created from a light beam that is obliquely incident on the birefringent member 1 and the phase difference of separated light beams created from a light beam that is perpendicularly incident on the birefringent member 1 can be reduced, so that brightness variances and coloring variances in the field of observation can be minimized.

Moreover, in a conventional microscope as well, the distance traveled by the light passing through the birefringent members is capable of being shortened by making the birefringent members 5 through 7 as thin as possible, thus making it possible to reduce the difference between the phase difference of the separated light beams, in the case of perpendicular incidence, and the phase difference of the separated light beams, in the case of oblique incidence. However, because of manufacturing limitations (e.g., polishing, etc.), the center thicknesses of the birefringent prisms, constituting the birefringent members, cannot be made smaller than 0.4 mm; accordingly, variances in the field of observation cannot be reduced by making the birefringent members thinner.

On the other hand, in the first and second embodiments, the distance traveled by light through the birefringent members can be shortened compared to the distance traveled in a conventional microscope, even if the center thicknesses of the birefringent prisms consisting of a birefringent material, are set at 0.4 to 0.6 mm (which is the manufacturing limit) and the center thickness of the isotropic prisms, consisting of an isotropic material, are set at 1 mm or greater (which can easily be manufactured). Accordingly, variances in the field of observation can be made smaller than in the conventional microscopes. Furthermore, in the case of isotropic prisms, the refractive index is fixed regardless of the angle of the light; accordingly, the effect is not hindered, regardless of the thickness of the prisms.

Thus, in the present invention, the birefringent members, in a differential interference microscope, are constructed using a birefringent crystal and an inexpensive and easily worked isotropic material. Accordingly, a reduction in cost can be achieved.

Furthermore, in the present invention, brightness variances and coloring variances in the field of observation can be reduced by constructing both of the birefringent members, in a differential interference microscope, from a birefringent material and an isotropic material and disposing these birefringent members so that the phase differences created by the birefringent members cancel each other.

It will be apparent to those skilled in the art that various modifications and variations can be made in the Transmission Illumination Type Differential Interference Microscope of the present invention without departing from the spirit or scope of the invention. Thus, it is intended that the present invention cover the modifications and variations of this invention provided they come within the scope and spirit of the appended claims and their equivalents.

What is claimed is:

1. A differential interference microscope comprising:
   a light source capable of providing a polarized light;
   a first birefringent optical member capable of separating the light from the light source into two linearly polarized light components having planes of vibration perpendicular to each other;

a condenser lens capable of conducting the two linearly polarized light components, separated by the first birefringent optical member, to an object being examined;

an objective capable of focusing each of the two linearly polarized light components from the object being examined;

a second birefringent optical member capable of synthesizing each of the two linearly polarized light components from the object being examined; and polarization interference means for synthesizing the linearly polarized light components, wherein the first birefringent optical member includes:
a first wedge-shaped prism made of an isotropic optical material, and
a second wedge-shaped prism positioned between the condenser lens and the first wedge-shaped prism and made of a birefringent optical material having a center thickness of between about 0.4 and 0.6 mm, and wherein the second birefringent optical member includes a third wedge-shaped prism made of a birefringent optical material having a center thickness of between about 0.4 and 0.6 mm, and a fourth wedge-shaped prism positioned between the third wedge-shaped prism and the polarization interference means and made of an isotropic optical material.

2. The differential interference microscope claimed in claim 1, wherein a front-side focal position of the condenser lens lies outside the condenser lens, and a rear-side focal position of the objective lies outside the objective, and wherein the first and second birefringent optical members are each capable of being formed by joining an isotropic prism and a birefringent prism.

3. The differential interference microscope claimed in claim 1, wherein either a front-side focal position of the condenser lens or a rear-side focal position of the objective lies outside the corresponding lens, while the remaining focal position lies inside the corresponding lens, and wherein the first and second birefringent optical members are each capable of being formed by joining an isotropic prism and a birefringent prism.

4. The differential interference microscope claimed in claim 3, wherein at least one of beam separation positions of the first and second birefringent optical members lies outside at least one of the condenser and the objective, and at least one of the second and third birefringent prisms has an optic-axis that is perpendicular to an optical axis of the differential interference microscope.

5. The differential interference microscope claimed in claim 1, wherein a phase difference between two linearly polarized light components generated by the first birefringent member cancels a phase difference between two linearly polarized light components generated by the second birefringent member.

6. The differential interference microscope claimed in claim 5, wherein a front-side focal position of the condenser lens lies outside the condenser lens, and a rear-side focal position of the objective lies outside the objective, and wherein the first and second birefringent optical members are each capable of being formed by joining an isotropic prism and a birefringent prism.

7. The differential interference microscope claimed in claim 1, wherein a front-side focal position of the condenser lens lies inside the condenser lens, a rear-side focal position of the objective lies inside the objective, and wherein of the two birefringent prisms, one of the prisms includes a positive-crystal birefringent optical material, while the other prism includes a negative-crystal birefringent optical material.

8. The differential interference microscope claimed in claim 1, wherein a front-side focal position of the condenser lens lies inside the condenser lens, the rear-side focal position of the objective lies inside the objective, the first and second birefringent optical members are each capable of being formed by joining an isotropic prism and a birefringent prism, and wherein of the two birefringent prisms, one of the prisms includes a positive-crystal birefringent optical material, while the other prism includes a negative-crystal birefringent optical material.

9. A differential interference microscope comprising:

a light source;

a polarizer;

a first birefringent optical member including a first isotropic wedge-shaped prism and a first birefringent wedge-shape prism;

a condenser lens;

an objective;

a second birefringent optical member including a second birefringent wedge-shaped prism and a second isotropic wedge-shaped prism; and an analyzer, wherein the light from the light source reaches an object being examined after passing through the polarizer, the first isotropic wedge-shaped prism, the first birefringent wedge-shaped prism and the condenser lens, while light from the object being examined is caused to undergo polarization interference via the objective, the second birefringent wedge-shaped prism, the second isotropic wedge-shaped prism, and the analyzer, and wherein the light from the light source passes through the first isotropic wedge-shaped prism, the first birefringent wedge-shaped prism, the object being examined, the second birefringent wedge-shaped prism and the second isotropic wedge-shaped prism, in that order.

10. The differential interference microscope claimed in claim 9, wherein a front-side focal position of the condenser lens lies outside the condenser lens, a rear-side focal position of the objective lies outside the objective, and wherein the first and second birefringent optical members are capable of being formed by joining one of the first and second isotropic wedge-shaped prisms and a corresponding one of the first and second birefringent wedge-shaped prisms.

11. The differential interference microscope claimed in claim 10, wherein center thicknesses of the first and second birefringent wedge-shaped prisms are between about 0.4 mm and 0.6 mm.

12. The differential interference microscope claimed in claim 11, wherein center thicknesses of the first and second isotropic wedge-shaped prisms are at least 1 mm.

13. The differential interference microscope claimed in claim 9, wherein one of a front-side focal position of the condenser lens or a rear-side focal position of the objective lies outside one of the condenser lens and the objective, while the other focal position lies inside the other one of the condenser lens and the objective, and the first and second birefringent optical members are each capable of being formed by joining one of the first and second isotropic wedge-shaped prisms and a corresponding one of the first and second birefringent wedge-shaped prisms.

14. The differential interference microscope claimed in claim 13, wherein center thicknesses of the first and second birefringent wedge-shaped prisms are between about 0.4 mm and 0.6 mm.

15. The differential interference microscope claimed in claim 14, wherein center thicknesses of the first and second isotropic wedge-shaped prisms are at least 1 mm.

16. The differential interference microscope claimed in claim 9, wherein a front-side focal position of the condenser lens lies inside the condenser lens, a rear-side focal position of the objective lies inside the objective, the first and second birefringent optical members are each formed by joining one of the first and second isotropic wedge-shaped prisms and a corresponding one of the first and second birefringent wedge-shaped prisms, and wherein one of the first and second birefringent wedge-shaped prisms includes a positive-crystal birefringent optical material, while the other birefringent wedge-shaped prism includes a negative-crystal birefringent optical material.

17. The differential interference microscope claimed in claim 16, wherein center thicknesses of the first and second birefringent wedge-shaped prisms are between about 0.4 mm and 0.6 mm.

18. The differential interference microscope claimed in claim 17, wherein center thicknesses of the first and second isotropic wedge-shaped prisms are at least 1 mm.

* * * * *